(12) United States Patent
Sachs

(10) Patent No.: US 11,694,094 B2
(45) Date of Patent: Jul. 4, 2023

(54) INFERRING DIGITAL TWINS FROM CAPTURED DATA

(71) Applicant: Swim.IT Inc, San Jose, CA (US)

(72) Inventor: Christopher David Sachs, Sunnyvale, CA (US)

(73) Assignee: SWIM.IT INC, San Jose, CA (US)

( * ) Notice: Subject to any disclaimer, the term of this patent is extended or adjusted under 35 U.S.C. 154(b) by 1445 days.

(21) Appl. No.: 15/928,049

(22) Filed: Mar. 21, 2018

(65) Prior Publication Data

US 2019/0294978 A1 Sep. 26, 2019

(51) Int. Cl.

| | |
|---|---|
| G06N 5/04 | (2023.01) |
| G06N 5/022 | (2023.01) |
| G06F 16/245 | (2019.01) |
| G06F 16/242 | (2019.01) |
| G05B 17/02 | (2006.01) |
| G05B 19/418 | (2006.01) |

(52) U.S. Cl.
CPC ............... *G06N 5/04* (2013.01); *G05B 17/02* (2013.01); *G05B 19/4182* (2013.01); *G06F 16/245* (2019.01); *G06F 16/2423* (2019.01); *G06N 5/022* (2013.01); *G05B 2219/31011* (2013.01); *G05B 2219/33027* (2013.01)

(58) Field of Classification Search
None
See application file for complete search history.

(56) References Cited

U.S. PATENT DOCUMENTS

| | | |
|---|---|---|
| 8,074,043 B1 | 12/2011 | Zeis |
| 2004/0268234 A1 | 12/2004 | Sampathkumar et al. |

(Continued)

FOREIGN PATENT DOCUMENTS

| | | |
|---|---|---|
| EP | 1686470 A1 | 8/2006 |
| EP | 2045684 A2 | 4/2009 |
| EP | 2045684 A3 | 11/2010 |

OTHER PUBLICATIONS

Tomlein, Context-Aware Integrability and Maintainability of Cyber-Physical Ecosystems: Tactics and Tools, Doctoral Thesis, Aarhus University, 2017, pp. 1-259 (Year: 2017).*

(Continued)

*Primary Examiner* — Kakali Chaki
*Assistant Examiner* — Michael H Hoang
(74) *Attorney, Agent, or Firm* — Newport IP, LLC; Jacob P. Rohwer

(57) ABSTRACT

In various examples there is a computer-implemented method performed by a digital twin at a computing device in a communications network. The method comprises: receiving at least one stream of event data observed from the environment. Computing at least one schema from the stream of event data, the schema being a concise representation of the stream of event data. Participating in a distributed inference process by sending information about the schema or the received event stream to at least one other digital twin in the communications network and receiving information about schemas or received event streams from the other digital twin. Computing comparisons of the sent and received information. Aggregating the digital twin and the other digital twin, or defining a relationship between the digital twin and the other digital twin on the basis of the comparison.

19 Claims, 12 Drawing Sheets

(56) References Cited

U.S. PATENT DOCUMENTS

| | | |
|---|---|---|
| 2014/0207820 A1 | 7/2014 | Lee |
| 2016/0247129 A1 | 8/2016 | Song et al. |
| 2017/0091613 A1 | 3/2017 | Ito et al. |
| 2018/0129959 A1 | 5/2018 | Gustafson |
| 2018/0189332 A1 | 7/2018 | Asher |
| 2018/0203959 A1 | 7/2018 | Refsnaes |
| 2019/0005200 A1 | 1/2019 | Zimmerman |
| 2020/0285977 A1 | 9/2020 | Brebner |

OTHER PUBLICATIONS

Banerjee, et al., "Generating Digital Twin models using Knowledge Graphs for Industrial Production Lines," WebSci'17, Jun. 25-28, 2017, 6 pages.

International Search Report and Written Opinion for co-pending PCT application No. PCT/GB2019/050786, dated Jun. 26, 2019, 13 pages.

Co-Pending PCT Application No. PCT/GB2019/050786 filed Mar. 20, 2019 entitled "Inferring Digital Twins From Captured Data," 31 pages.

Non-Final Office Action for U.S. Appl. No. 15/928,053, dated Feb. 18, 2021, 56 pages.

\* cited by examiner

US 11,694,094 B2

INFERRING DIGITAL TWINS FROM CAPTURED DATA

BACKGROUND

The present technology is concerned with digital twins which are digital representations of physical objects or processes. Digital twins are used in many application domains including product and process engineering, internet of things, logistics, asset management, and others. The digital twin provides a model of the behavior of the physical object and once such digital representations are available it is possible for automated computing systems to use the digital twins to facilitate management and control of the physical objects.

Digital twins are often manually created by an operator or expert who is familiar with the physical objects to be represented and understands how the physical objects behave and/or interact with one another. However, it is time consuming and burdensome to form digital twins in this way and difficult to scale the process up for situations where there are huge numbers of digital twins to be formed.

The embodiments described below are not limited to implementations which solve any or all of the disadvantages of known apparatus and methods for inferring digital twins.

SUMMARY

The following presents a simplified summary of the disclosure in order to provide a basic understanding to the reader. This summary is not intended to identify key features or essential features of the claimed subject matter nor is it intended to be used to limit the scope of the claimed subject matter. Its sole purpose is to present a selection of concepts disclosed herein in a simplified form as a prelude to the more detailed description that is presented later.

In various examples there is a computer-implemented method performed by a digital twin at a computing device in a communications network. The method comprises: receiving at least one stream of event data observed from the environment. Computing at least one schema from the stream of event data, the schema being a concise representation of the stream of event data. Participating in a distributed inference process by sending information about the schema or the received event stream to at least one other digital twin in the communications network and receiving information about schemas or received event streams from the other digital twin. Computing comparisons of the sent and received information. Aggregating the digital twin and the other digital twin, or defining a relationship between the digital twin and the other digital twin on the basis of the comparison.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein.

Like reference numerals are used to designate like parts in the accompanying drawings.

DETAILED DESCRIPTION

The detailed description provided below in connection with the appended drawings is intended as a description of the present examples and is not intended to represent the only forms in which the present example are constructed or utilized. The description sets forth the functions of the example and the sequence of operations for constructing and operating the example. However, the same or equivalent functions and sequences may be accomplished by different examples.

As mentioned above a digital twin is a digital representation of a physical object or process. A digital twin of a physical object or real world process comprises software which simulates or describes event data about the behavior of the physical object or real world process. The event data is obtained by monitoring the physical objects or processes, for example, using capture apparatus in the environment of the physical object or process. Additionally or alternatively sensors instrumenting the physical objects or processes are used to obtain the event data.

Figure 1:
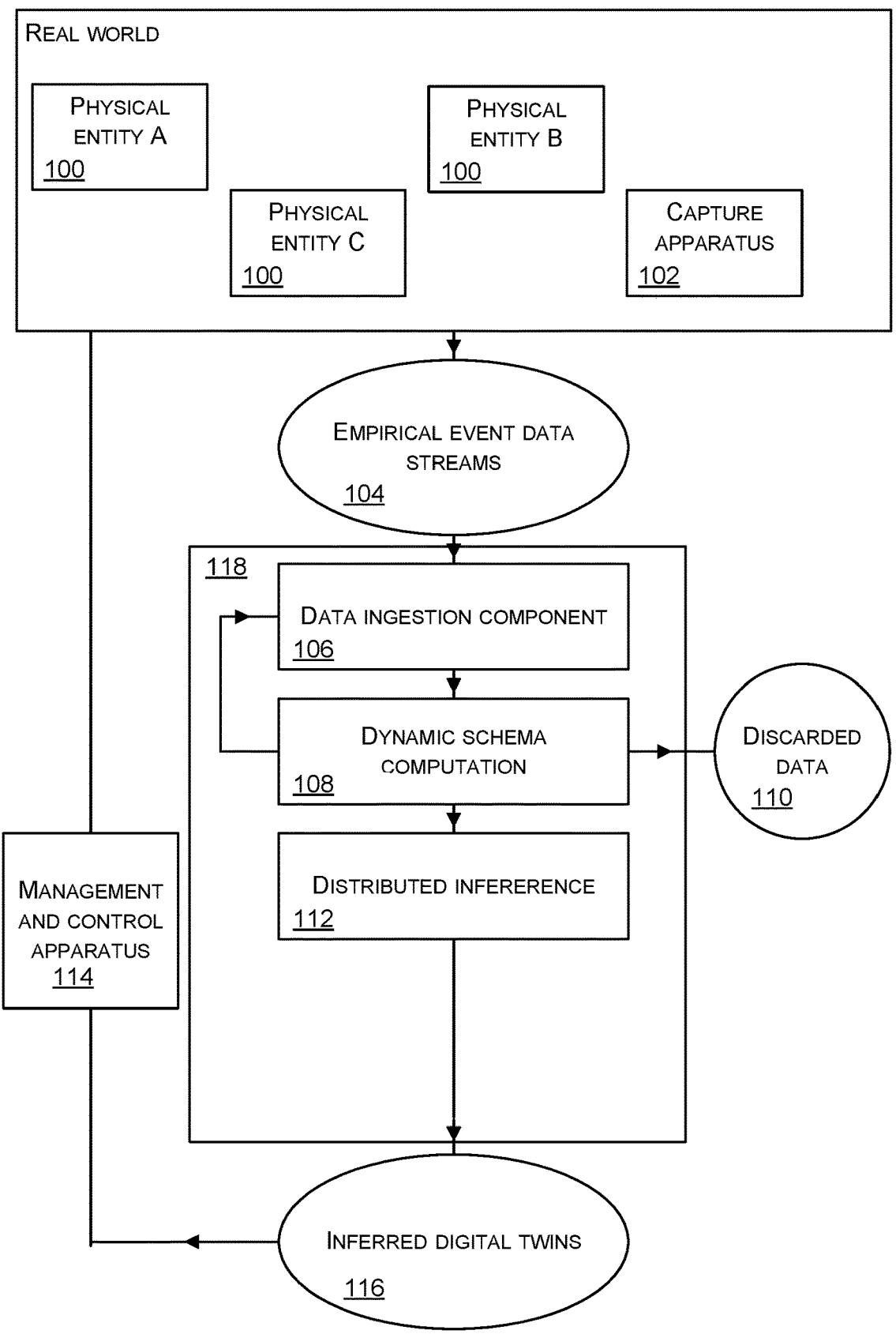
FIG. 1 is a schematic diagram of physical entities in the real world and showing a high level process for inferring digital twins of the physical entities from event data streams related to behavior of the physical entities.

FIG. 1 is a schematic diagram of one or more event data streams 104 which are observed from the behavior of physical entities 100 in the real world. The event data is captured by capture apparatus 102 which is any type of sensor or other apparatus for capturing data about the behavior of the physical entities 100. In FIG. 1 only one capture apparatus 102 is shown for clarity, although in practice there are many capture apparatuses. The physical entities 100 are any physical objects or processes where it is required to capture and analyze data about the behavior of the physical entities 100. In the case that a physical entity 100 comprises a process the physical entity 100 is something which is able to carry out a process, such as a manufacturing apparatus, a router in a telecommunications network, a traffic light. A non-exhaustive list of examples of physical entities 100 is: street light, traffic signal installation, domestic appliance, automotive vehicle, logistics asset, power distribution network equipment.

The event data stream 104 is a real time stream of event data. A non-exhaustive list of examples of event data is: temperature measurements, ambient light levels, latitude and longitude data, power level, error rate and many other data values associated with events in the behavior of the physical entities 100. Each event data item is associated with a time of occurrence of the event and these times are referred to as time stamps.

The event data 104 is input to a computing device 118 which, in some examples, is an edge device at the edge of the internet or other communications network. Computing device 118 does not have to be an edge device and in some cases is located at the core of a communications network. Note that FIG. 1 shows one computing device 118 although in practice there are many of these. The task of the computing device 118 is to work together with other such computing devices 118 to automatically compute a digital twin, one for each physical entity 100.

In the examples described herein, each digital twin comprises a schema having one or more fields for interpreting the event data in the event data stream 104. It is not straightforward to compute the digital twins because the data in the event data stream 104 is not labelled as being for particular ones of the physical entities 100. The capture apparatus 102 is able to capture the event data from the environment of one or more of the physical entities 100 and the computing device does not know which physical entity 100 gave rise to which event data. Thus the computing device, with no prior knowledge of the physical entities 100, has to automatically derive one digital twin for each of the physical entities 100 from the event data streams 104. The computing device does not know how many physical entities 100 there are and it does not know how the physical entities 100 are positioned in relation to one another, or other data about the physical entities 100.

The computing device 118 works with other such computing devices which receive event data streams 104 from other capture apparatus 102 capturing event data about the physical entities 100. In this way distributed inference is carried out to infer digital twins, one for each of the physical entities 100. In various examples described herein, the computing device 118, together with other such computing devices, also infers which of the digital twins it computes are peers. A digital twin is a peer of another digital twin when those digital twins are functionally equivalent but represent separate physical objects.

The computing device 118 has a data ingestion component 106 which receives the event data stream 104 in real time, decodes data payloads of the event data stream, infers structural types present in the event data stream and carries out various other pre-processing tasks. The data ingestion component 106 is described in more detail with reference to FIG. 3 later in this document.

The computing device 118 has a component for schema computation 108. This component takes output from the data ingestion component 106, where that output comprises structural types describing the event data streams, and computes a schema of the event data stream. The schema represents the observed data and is computed automatically from the observed data rather than being defined by a human operator. The schema is for interpreting the data in the event data stream and it comprises one or more fields, each field having a structural type and a range of possible values. A schema comprises structural types and metadata about the structural types. A non-exhaustive list of examples of metadata about structural types is: name of string, time range in which the schema was generated, information about how the schema has been used to compute a mapping, a user annotation. Schema computation is described in detail with reference to FIGS. 4A and 4B.

The computing device 118 has a component for distributed inference 112. The distributed inference component 112 sends and receives data about the dynamic schemas and/or the event data, with other ones of the computing devices 118. The distributed inference component 112 makes comparisons and aggregates digital twins, or establishes peer relationships between digital twins, according to the comparison results. The comparisons are between the sent and received data as explained in more detail with reference to FIGS. 5 and 6A to 6D. The data ingestion component 106, dynamic schema computation 108 and distributed inference 112 operate continually and at any point in time the current inferred digital twins 116 are available as output. Identification of any peers in the output digital twins is also output.

The inferred digital twins 116 are made available to a management and control apparatus 114 for analysis and control of the physical entities 100. The inferred digital twins 116 are used to predict behavior of the physical entities 100. The predicted behavior is used by the management and control system 114 to control the physical entities 100 and/or is used by a human operator to control the physical entities. In this way efficiencies in the maintenance and control of the physical entities 100 is achieved.

Alternatively, or in addition, the functionality of a digital twin described herein is performed, at least in part, by one or more hardware logic components. For example, and without limitation, illustrative types of hardware logic components that are optionally used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), Graphics Processing Units (GPUs).

Figure 2A:
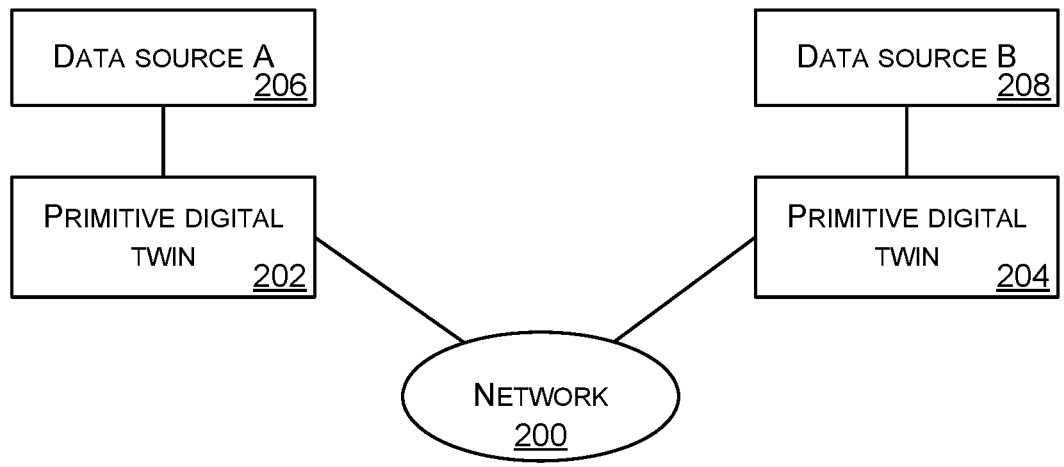
FIG. 2A is a schematic diagram of primitive digital twins at the start of a process of analyzing edge data.

FIG. 2A is a schematic diagram of two primitive digital twins 202, 204 and associated data sources 206, 208. A primitive digital twin is an initial estimate of a digital twin. In an example, one primitive digital twin is formed for each capture apparatus and the inference process of the present technology is used to infer the correct number of digital twins to be used as now explained.

In FIG. 2A data source A 206 is an instance of a capture apparatus 102 and data source B 208 is another instance of a capture apparatus 102. The data from data source A 206 is fed into primitive digital twin 202 which is located at one of the computing devices 118 of FIG. 1 and which is an edge device in some examples. The data from data source B 208 is fed into primitive digital twin 204 which is another one of the computing devices 118 of FIG. 1. FIG. 2A illustrates an example of the beginning of the inference process of FIG. 1.

Figure 2B:
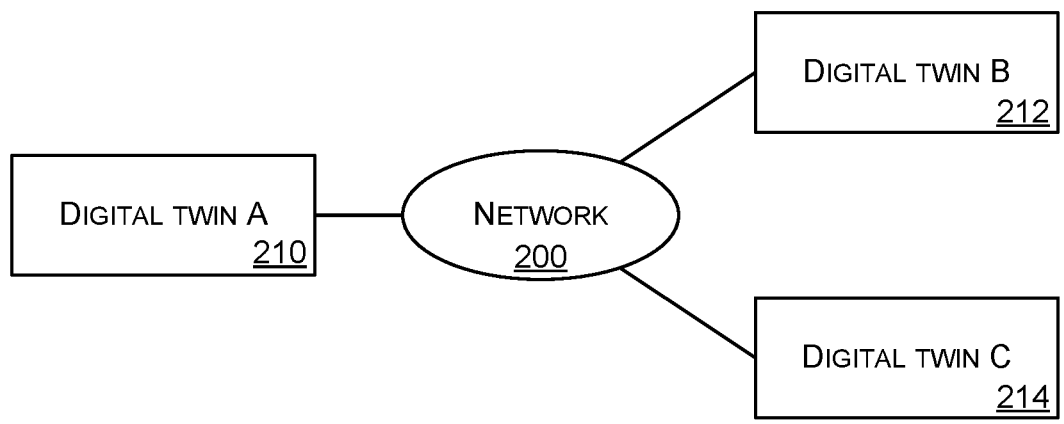
FIG. 2B is a schematic diagram of digital twins computed at the end of the process of analyzing edge data.

FIG. 2B illustrates an example of the end of the inference process of FIG. 1 and FIG. 2A. Here three digital twins 210, 212, 214 have been inferred from the data sources A 206 and B 208 of FIG. 2A. The distributed inference process of FIG. 1 enables the three digital twins 210, 212, 214 to be inferred even though there are only two data sources creating the event data streams. Consider the situation where data source B 208 comprises event data from two independent but geographically close traffic signal installations. The distributed inference process has been able to correctly infer that there are two digital twins, digital twin B 212 and digital twin C 214, in order to model the event data from data source B 208. This is achieved even though the inference process has no prior information about the data sources A 206 and B 208.

Figure 3A:
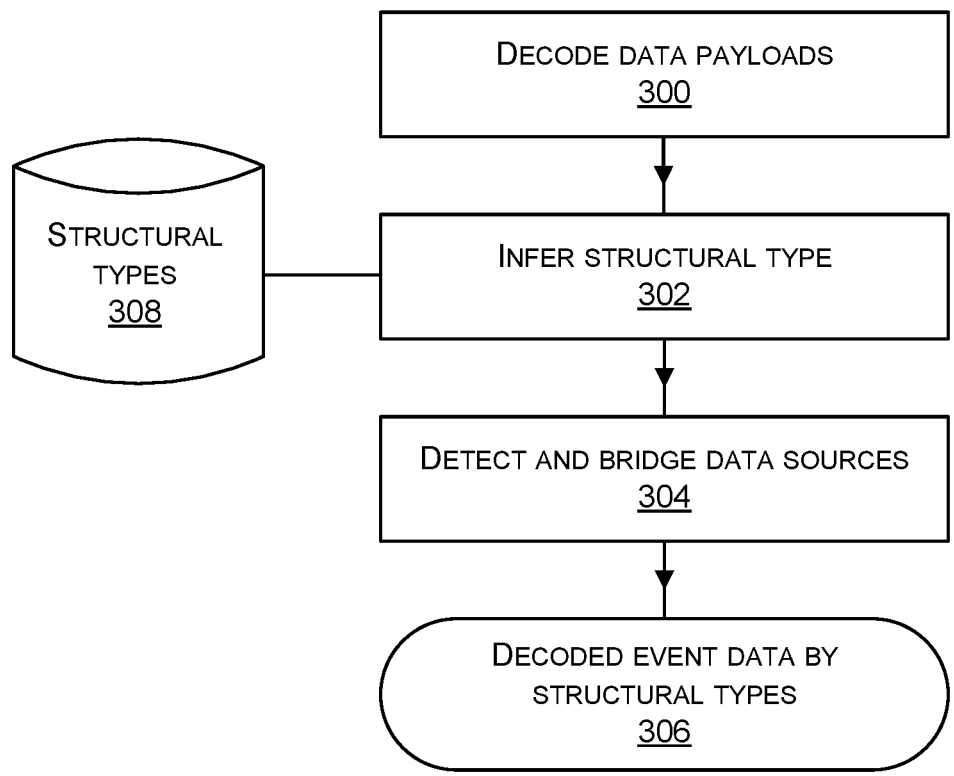
FIG. 3A is a flow diagram of a method of data ingestion such as that of FIG. 1.

FIG. 3A is a flow diagram of an example of a method performed at the data ingestion component 106 of FIG. 1. The data ingestion component 106 receives packets of event data in the event data stream from at least one capture apparatus 102. Each packet of event data comprises a payload with the event data content and this is encrypted in some cases. The data ingestion component 106 decodes 300 the data payloads (by decrypting) and is then able to analyze the content of the decoded payloads. The data ingestion component 106 has access to a library or store of structural types. A structural type is a representation of a set of structured values. A structured value is data in a specified format and a non-exhaustive list of examples of structured values is: an array with two values, an array of varying length, an associative array comprising key value pairs, and others.

The data ingestion component uses a type system to infer 302 the structural types of the decoded data payloads as described below with reference to FIG. 3B and FIG. 3C. Because of the complexity of the structural type inference process this has been moved out of FIG. 3A to give more clarity to FIG. 3A.

The data ingestion component also detects and bridges data sources at operation 304. To detect data sources any suitable method is used. For example, in some cases the data ingestion component is provided with information about the data sources from a separate automated system which is configured to detect the data sources. In some cases the data ingestion component detects the data sources itself by inspecting packet headers of packets of event data it receives and extracting information from the packet headers about the senders (capture apparatus instances 102).

The data ingestion component bridges data sources by allocating greater or lesser amounts of bandwidth on communications links between the data sources. In some examples the data ingestion component does the bridging of the data sources indirectly by instructing a separate automated system to adjust the bandwidth allocations. In other examples the data ingestion component does the bridging of the data sources itself.

The output 306 of the data ingestion component is decoded event data by structural type.

Figure 3B:
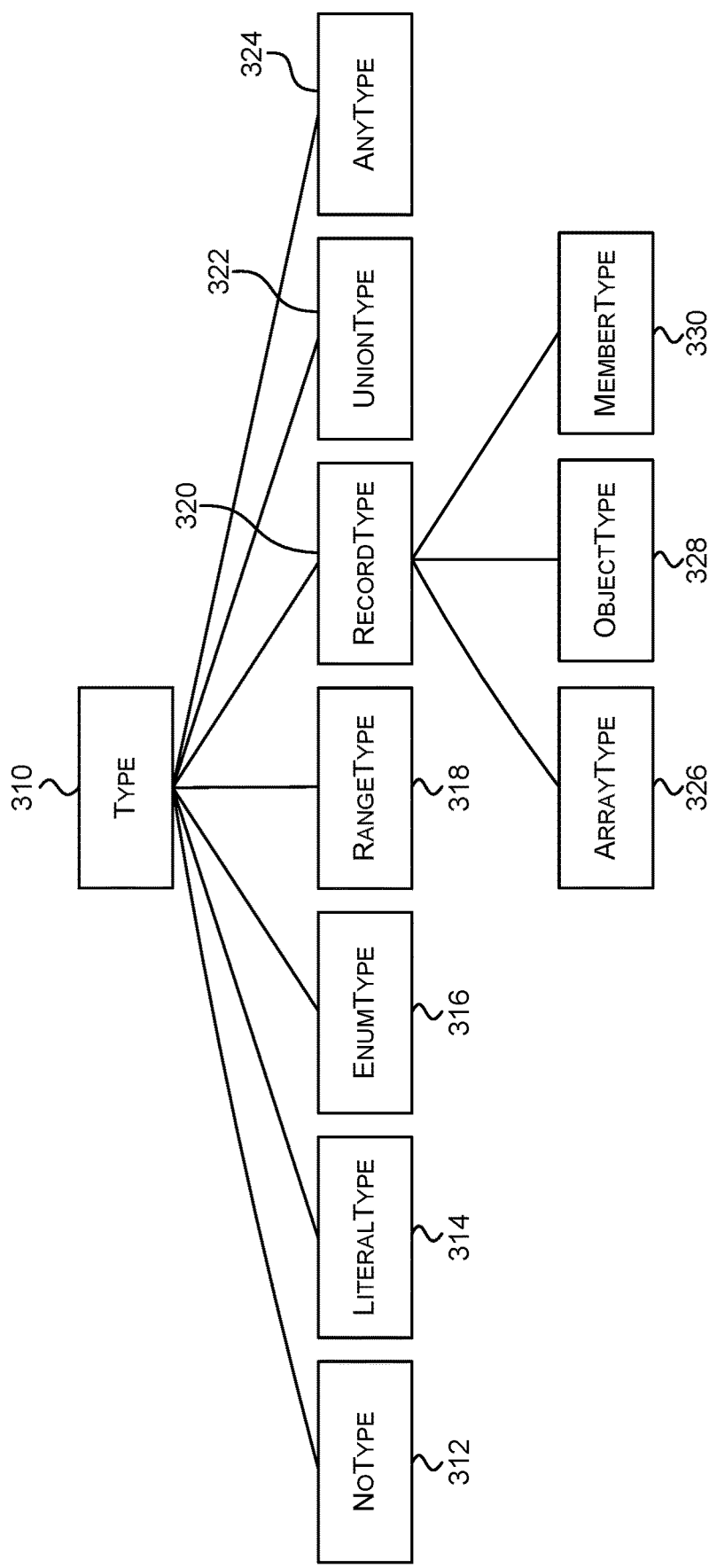
FIG. 3B is a schematic diagram of a structural type system hierarchy.

FIG. 3B shows a structural type system hierarchy which is an example of the library of structural types 308 used in the process of FIG. 3A by the data ingestion component. The structural type system hierarchy has a root type 310 representing a set of structured values. The root type 310 gives rise to a plurality of first level structural types which are: NoType 312, LiteralType 314, EnumType 316, RangeType 318, RecordType 320, UnionType 322 and AnyType 324. The RecordType 320 gives rise to a plurality of second level types which are ArrayType 326, ObjectType 328 and MemberType 330. In FIG. 3B the types within the hierarchy are ordered by level of generality of the types with the most precise types on the left hand side and the most general types on the right hand side. NoType 312 is the type of the empty set of values. LiteralType 314 is the type of a set with exactly one value. EnumType 316 is a precise type of a set with more than one value. RangeType 318 represents a bounded range of ordered values. RecordType 320 represents a set of aggregate values. Within RecordType 320, the ArrayType 326 represents a set of arrays with elements of a given type, the ObjectType 328 represents the set of associated arrays with fields of a given type, and MemberType 330 represents a set of aggregate types that contain an element of a given type. UnionType 322 represents the union of multiple types. AnyType 324 is the set of all values.

Figure 3C:
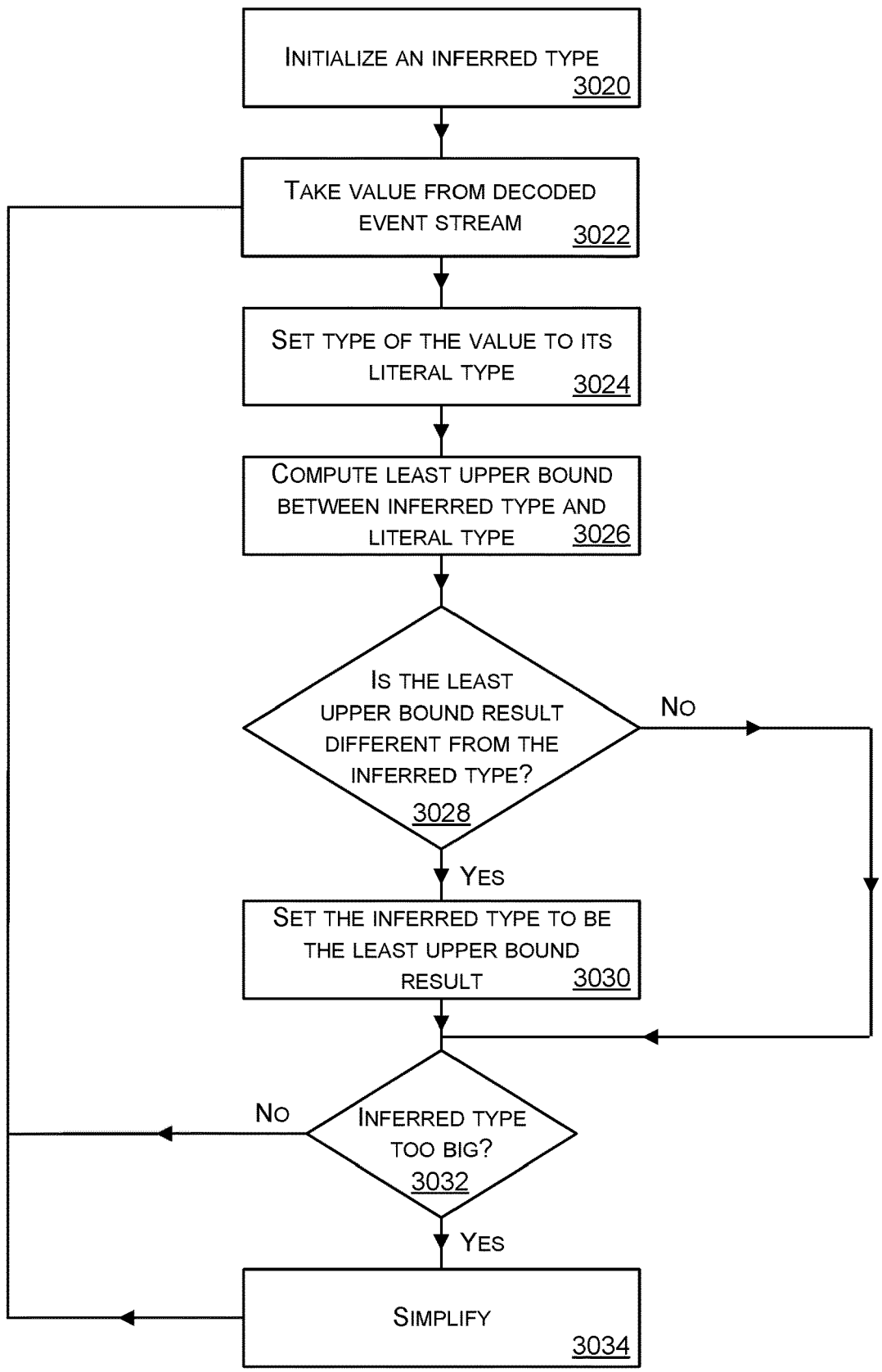
FIG. 3C is a flow diagram of a method of structural type inference suitable for use as part of the method of FIG. 3A.

FIG. 3C is a flow diagram of a method of structural type inference suitable for use as part of the method of FIG. 3A. The process of FIG. 3C is a repeating process carried out by a primitive digital twin; it repeats as new values from the event data stream are observed. The process takes values from the decoded event stream and computes one or more structural types which represent the decoded event stream data which has been observed recently in an extremely concise form. The structural types inferred by the process of FIG. 3C change over time, such as where the primitive digital twin begins operation and has little knowledge of the event data stream and learns the structural types over time as more data from the event data stream is observed.

The process of FIG. 3C is thus a data compression process although it is not reversible; that is a structural type inferred using the process of FIG. 3C cannot be used to regenerate the exact same event data which led to generation of the structural type.

The process of FIG. 3C is specially designed to work with structured values in the decoded event stream (such as arrays and other data structures). It is complex to deal with structured values (as opposed to unstructured values) because the structure of the structured values is not known by the primitive digital twin and it needs to be discovered and persisted. The information about the structure of the values in the event data stream is very important for predicting the behavior of the physical object or process that the digital twin represents. However, it is not straightforward to find this structure since there is no knowledge about the structure available to the primitive digital twin from sources other than the event stream itself.

The primitive digital twin tries to find a way to compress the event data stream because it is not practical to retain all the data in the event data stream. However, if conventional data compression methods are used the structure in the event data stream is lost or corrupted.

The method of FIG. 3C provides a way to infer structural types (from the hierarchy of FIG. 3B) which are present in the event data stream and as part of this inference process the event data stream is compressed into the inferred structural types. For example, a stream of event data from a traffic light in the real world is compressed using the method of FIG. 3C into three structural types: a literal type representing an identifier of the traffic light, an Enumtype comprising four specific values of a temperature sensor at the traffic light, and a range type representing a range of values from a humidity sensor at the traffic light.

The process of FIG. 3C describes the case of inferring one structural type. In practice there are typically a plurality of different structural types in the event data stream and so the process of FIG. 3C happens in parallel for each of the structural types.

The process of FIG. 3C begins with the primitive digital twin initializing 3020 an inferred type by setting the inferred type to an initial default structural type, such as the root structural type from the structural type hierarchy of FIG. 3A. The primitive digital twin takes 3022 a value from the decoded event stream such as by taking the next value from that stream. The primitive digital twin sets 3024 the structural type of the value to its literal type. The literal type of the value taken from the event stream is found by inspecting the value and comparing it with a plurality of possible literal types.

The primitive digital twin computes 3026 a least upper bound between the inferred type and the literal type. The least upper bound of a structural type A, and a structural type B, is the minimal structural type that includes all values of structural type A, and all values of structural type B (where the minimal type is the smaller type in terms of memory size needed to store the type in a memory). An approximation to the least upper bound of structural type A and structural type B is computed in an efficient manner by computing a union of structural type A and structural type B. A least upper bound is less precise than a union, however despite that difference, the process of FIG. 3C, is found to give good results in practice and by using the more efficient union computation significant efficiencies are gained which make it possible to scale up the process of FIG. 3C for high data rates on the incoming event stream.) The least upper bound is computed by taking a union between the inferred type and the literal type.

The primitive digital twin checks 3028 whether the least upper bound result is different from the inferred type. If so, the inferred type is set 3030 to be the least upper bound result and the process continues at operation 3032 by checking the size of the inferred type. If the check at operation 3028 shows that the least upper bound result is the same as the current inferred type then the process moves directly to operation 3032.

At operation 3032, if the inferred type is larger than a threshold the inferred type is simplified 3034 in order to reduce its size. In an example, to simplify an EnumType comprising a list of values a range type is computed which expresses the range of values in the EnumType rather than listing each of the values in the EnumType. More generally, an inferred type is simplified by using the structural type hierarchy of FIG. 3A to compute a type which is more general than the inferred type and so which is further to the right hand side in the hierarchy of FIG. 3A than the inferred type itself. Since the simplified type is more general than the inferred type the simplified type has less information than the inferred type and so is smaller. Use of the structural type hierarchy to simplify the inferred type gives a principled and effective way of compressing the data from the event stream which is found to work extremely well in practice.

After the inferred type has been simplified at operation 3034, or has been found to be smaller than the threshold at operation 3032, the process returns to operation 3022 at which the next value from the decoded event stream is taken to be processed using the method of FIG. 3C. Thus the process of FIG. 3C runs repeatedly such as at regular or irregular time intervals. At any point in time the current inferred type is read out from the process of FIG. 3C for use by the primitive digital twin in schema inference as described below with reference to FIGS. 4A and 4B.

The process of FIG. 3C is nested in some cases. That is, where the structural type inferred in FIG. 3C itself comprises one or more other structural types, the process of FIG. 3C is used recursively. Thus in the case of structural types such as arrays the process of FIG. 3C is used many times, once for each field of the array. The amount of computing resources for the method of FIG. 3C increases dramatically where nesting occurs such as in the case of arrays. In some examples heuristics are used to reduce the amount of computing resources needed. An example of such a heuristic is a process which takes into account whether the inferred structural type is a required field of a schema, an optional field of a schema or a repeated field of a schema and which graduates the amount of processing done according to whether a required, optional or repeated field is involved. If the field is a required field the method of FIG. 3C is not repeated as no change to the structural type is to be made. If the field is an optional field the method of FIG. 3C is repeated less frequently than if the field is a repeated field.

Another heuristic comprises checking for an amount of variation in the dimensionality of an array in the case that the inferred structural type is an array of arrays. If the amount of variation of the dimensionality is above a threshold level the process of FIG. 3C stops tracking indices of the array and tracks values of the array.

An example of the operation of FIG. 3C is now given to further aid understanding of the technology and this example is not intended to limit the scope of the technology since it is apparent that many other examples are possible.

Suppose the inferred type is currently a literal type such as the type integer. The primitive digital twin receives the integer 1 from the event stream and sets the type of this integer 1 to its literal type which in this case is the type integer. The least upper bound result is 1 at operation 3028 and the process moves to operation 3032. The inferred type is smaller than the threshold and the process returns to operation 3022. The next value from the event stream is the integer 2 and the type is set to the literal type which is the type integer. The least upper bound is computed as the union of 1 and 2 which is the set of values 1, 2. The inferred type becomes the set of values 1, 2 which is found to be smaller than the threshold and so the process returns to operation 3032. The next value from the event stream is the number 1.5 and its type is set to float at operation 3024. The least upper bound computed at 3026 is the union of 1, 1.5, 2 which is 1, 1.5, 2. The inferred type is now 1, 1.5, 2 and is larger than the threshold at operation 3032. The inferred type 1, 1.5, 2 is simplified to the range 1 to 2.

The process of FIG. 3C comprises a check at operation 3032 as to whether the size of the inferred type is above a threshold. Various different ways of setting the threshold are used in different examples of the technology, such as manually configuring the threshold through empirical testing for a particular application domain and according to the amount of memory and computing resources available at the primitive digital twin, automatically configuring the threshold using rules which take into account one or more of: characteristics of the event data stream, memory at the primitive digital twin, computing resources at the digital twin. In a preferred embodiment the threshold is dynamically adjusted automatically during operation of the process of FIG. 3C according to one or more of: a number of iterations of the process of FIG. 3C which have taken place, a length of time during which the process of FIG. 3C has been operating, an amount of memory currently available at the primitive digital twin, an amount of processing capacity currently available at the primitive digital twin, an observed amount of compression of the event data stream produced by the process of FIG. 3C.

Figure 4A:
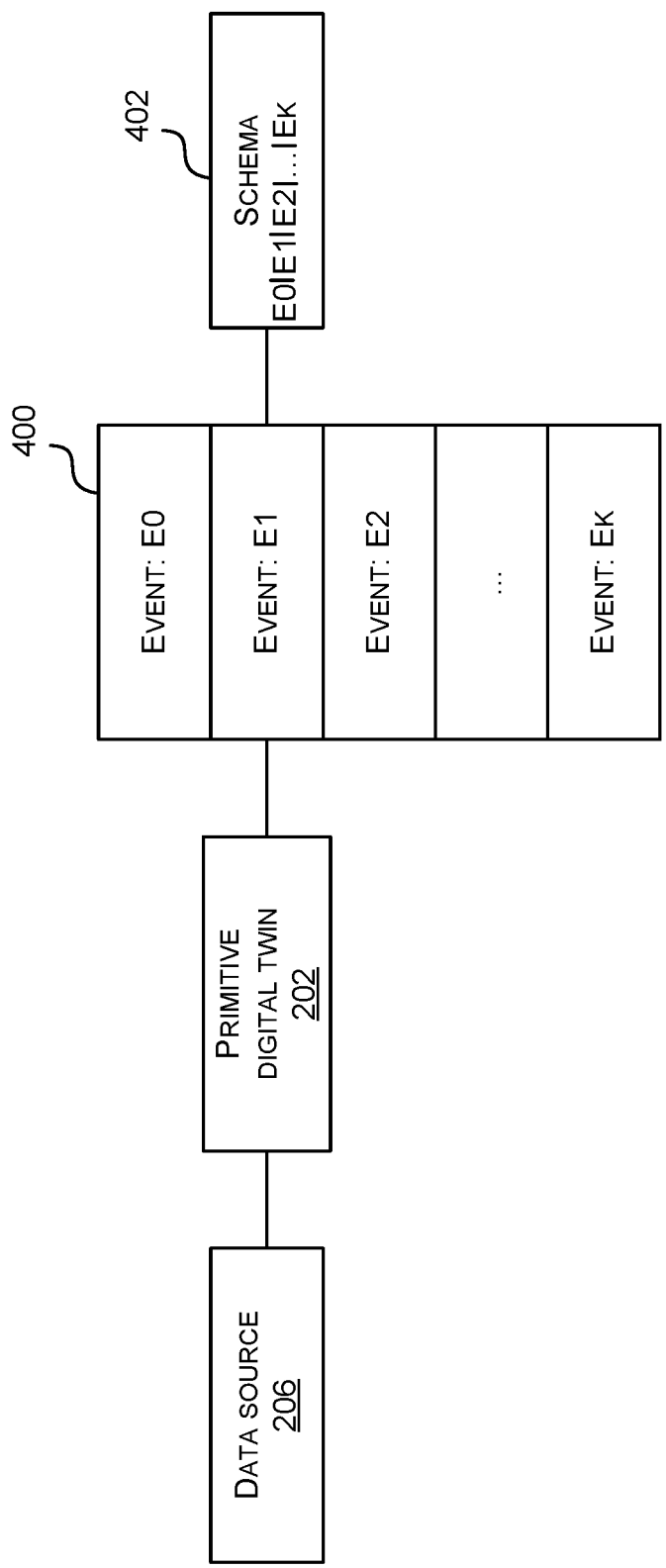
FIG. 4A is a schematic diagram of a process of computing a dynamic schema.

FIG. 4A is a schematic diagram of an example of dynamic schema computation. Dynamic schema computation takes inferred structural types computed by the data ingestion component and computes schemas from these. Recall that a schema is one or more structural types with metadata. The process of FIG. 4A has access to inferred structural types from the process of FIG. 3C which is done by the data ingestion component. The process of FIG. 4A is performed by a primitive digital twin.

A data source 206 of captured event data is fed to a computing device 202 executing the primitive digital twin, such as an edge device or other computing device. The primitive digital twin buffers event data items, of the same structural type, for K events from the event data stream in buffer 400. It computes the union between pairs of event data items in the buffer to produce a field of a schema 402. The buffer is then emptied. This process repeats for other structural types, one for each field of the schema. Note that the primitive digital twin has the structural type information since this has been computed using the process of FIG. 3C. In practice the processes of FIG. 3C and FIGS. 4A and 4B execute in parallel. By executing in parallel, the most up to date inferred structural types are available to the process of FIGS. 4A and 4B which improves accuracy. The process of FIG. 4A repeats over time so that the schema 402 is dynamic since it is continually updated.

Computing the union is a fast, efficient and effective way of enabling the computing device to retain useful parts of the event data in the schema and discard the majority of the event data. Thus the computing device is able to operate for huge amounts of event data without breaking down or introducing errors.

Figure 4B:
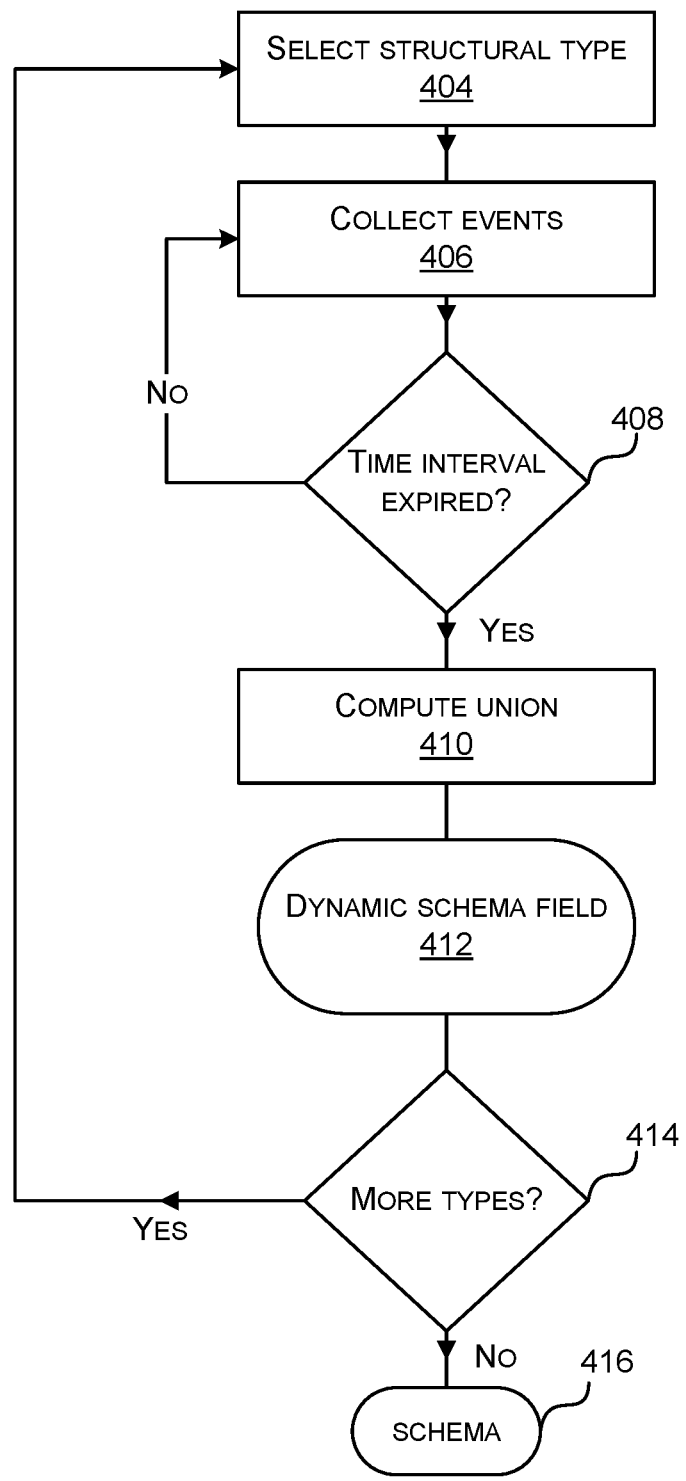
FIG. 4B is a flow diagram of the method of FIG. 4A in more detail.

FIG. 4B is a flow diagram of another example of a method of dynamic schema computation. The method of FIG. 4B has access to the event data and to inferred structural types associated with the event data which have been computed by the process of FIG. 3C. The method of FIG. 4B is repeated for individual structural types from the structural type hierarchy of FIG. 3A.

A structural type is selected 404 from a library of possible structural types such as the structural type hierarchy of FIG. 3A. Event data items are collected 406, which have the selected structural type, until a specified time interval has expired 408. Pairs of the collected event data items are formed where each pair comprises an event data item and the immediately subsequent event data item. The union of the pairs of the event data is computed 412 to give a dynamic schema field 412 having a range of values. A check 414 is made to see if there are more structural types, and if so, the process repeats from operation 404. Otherwise the schema 416 is output.

An example of a schema is now given to aid understanding of the technology and it is understood that this example does not limit the scope of the technology. In this example the schema comprises a sequence of four fields where the first is a latitude key of structural type "range" and having the range 37 to 45. The second is a longitude key of structural type "range" and having the range 30 to 50, the third is an identifier of structural type "string", the fourth is an array with structural type "array" where the first item in the array is of structural type "string", the second item in the array having structural type integer and so on.

The methods of FIGS. 4A and 4B are efficient processes for computing schemas from inferred structural types and event data. The processes act to further compress the data of the event data stream and enable the primitive digital twin to intelligently process huge amounts of sensed event data.

As mentioned above with reference to FIG. 1 a process of distributed inference between two or more primitive digital twins takes place in order to infer digital twins and infer relationships between the digital twins as now described with reference to FIG. 5.

Figure 5:
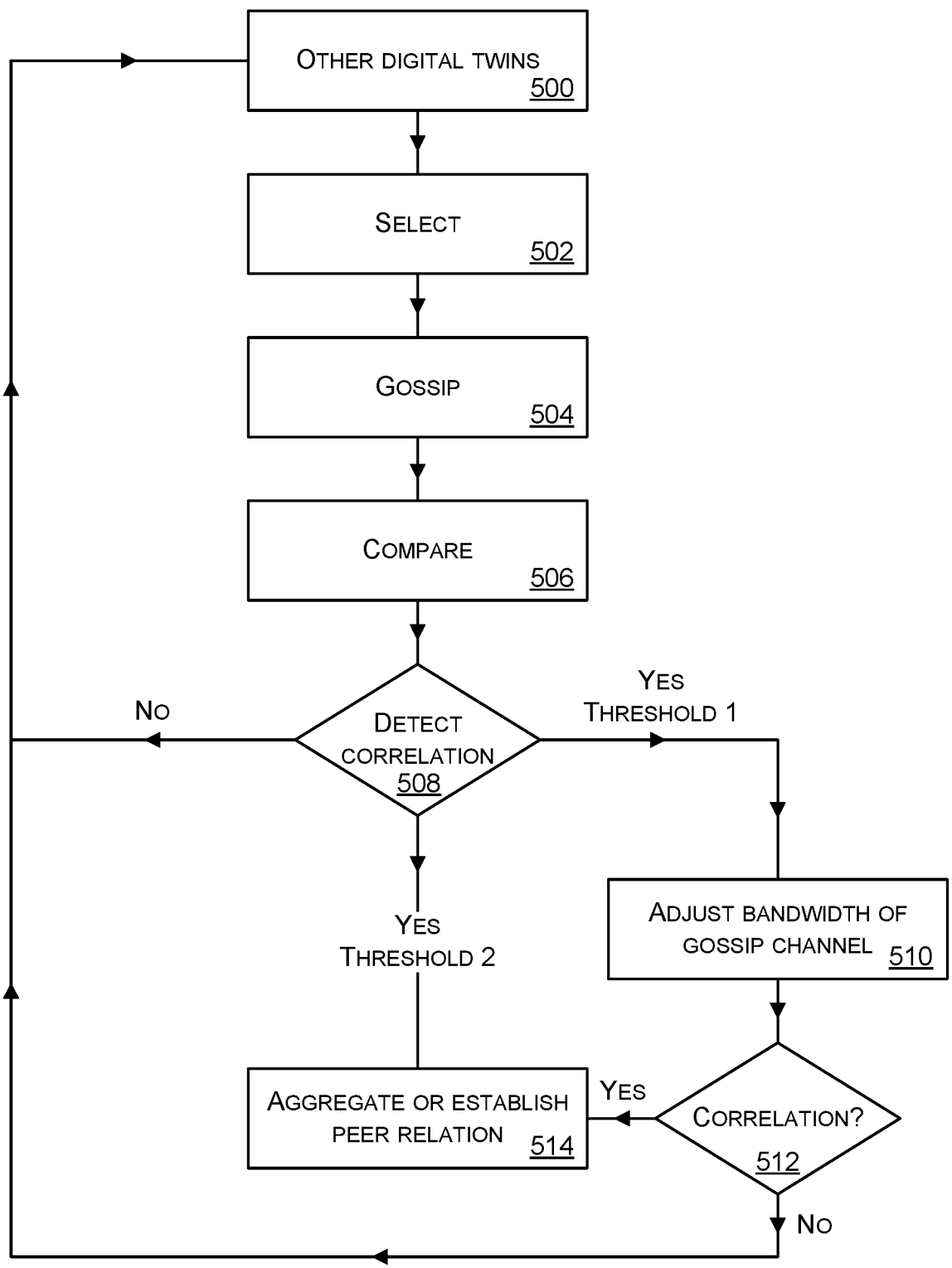
FIG. 5 is a flow diagram of a method of distributed inference such as that of FIG. 1.

FIG. 5 is a flow diagram of an example of a method of distributed inference. The method of FIG. 5 is performed by a digital twin at a computing device 118 such as an edge computing device or other computing device. The computing device 118 comprises a digital twin which in some examples is a primitive digital twin. The digital twin at the computing device 118 (see FIG. 1) has knowledge about one or more other primitive digital twins 500 in communication with it via a communications network of any type. The knowledge is preconfigured or is obtained from another computing system. At this point the digital twin at the computing device 118 does not know how many physical objects there are and what the relationship is between the physical objects and the potential digital twins. Peer relationships between digital twins are unknown at this point.

The digital twin at the computing device 118 selects 502 one of the other primitive digital twins. The selection is random or according to one or more heuristics. An example of a heuristic is to select a digital twin with the closest physical proximity.

The digital twin at the computing device 118 gossips 504 with the selected primitive digital twin using a communications channel between the computing device 118 and the selected primitive digital twin, referred to as a gossip channel. Gossiping means sending and receiving data about dynamic schemas or event data. The computing device 118 compares 506 the sent and received data. If a potential correlation is detected 508 between the sent and received data then a bandwidth of the gossip channel is increased. If a potential correlation is not detected then the process returns to operation 500 and another one of the other primitive digital twins is selected at operation 502. Any well know statistical process is used to compute the correlation.

If a potential correlation is found at check 508 and the correlation is above a first threshold amount but below a second threshold amount, the process proceeds to operation 510. At operation 510 the bandwidth of the gossip channel between the present digital twin and the other primitive digital twin which was selected at operation 502 is increased. The increased bandwidth is used to gossip larger amounts of data so that finer grained data is communicated between the gossip partners of the gossip channel. Once the larger amounts of data are gossiped an assessment of correlation between the data sent and received over the gossip channel is made. The assessment is indicated at check point 512 of FIG. 5. If the assessment finds insufficient evidence for correlation the process returns to operation 500 and repeats. If the assessment finds sufficient evidence for correlation the process either aggregates 514 the present digital twin and the primitive digital twin selected in operation 502 (that is, the digital twins of the gossip channel), or the process establishes a peer relation. Aggregation is done when, for practical purposes, there is insignificant difference between the sent and received data on the gossip channel so that both the digital twins on the gossip channel effectively have the same schema. A peer relation is established when the data sent on the gossip channel is essentially the same as the data received on the gossip channel, except for at least one field of the schema which is consistently the same in the sent data, and at least one field of the schema which is consistently the same in the received data but different from the field which is consistently the same in the sent data. An inference is made that the schema which is consistently the same in the sent data represents an identifier and the same is done for the received data. In this way an inference is made that there are two separate digital twins and these separate digital twins have the same behaviour. In reality the two separate digital twins may be two street lights of the same type but in different locations (for example) where the street lights operate in the same manner.

When two primitive digital twins are aggregated this is done by deleting one of the two primitive digital twins after having redirected the event stream of the deleted primitive digital twin to the remaining primitive digital twin of the two. When two primitive digital twins are found to have a peer relation there is no change to the digital twins themselves, although these two digital twins now have stored information indicating the identity of a peer.

Operation 514 is also reached directly from operation 508 in cases where the correlation at operation 514 is above a second threshold which is higher than the first threshold.

In this way the method of FIG. 5 enables aggregation or peer relations to be established in an efficient manner. This is because, if the correlation is found to be strong at check 508 there is no need to adjust the bandwidth of the gossip channel at operation 510 which is resource intensive and time consuming.

The method of FIG. 5 is very effective since if a potential correlation is detected at operation 508, at a point when the gossiped information is extremely concise, the process of 510 is used to check whether there is in fact a correlation. This greatly improves accuracy since errors where noise in the gossiped data is mistakenly detected as indicating a need for aggregation or a peer relation, are significantly reduced.

Figure 6A:
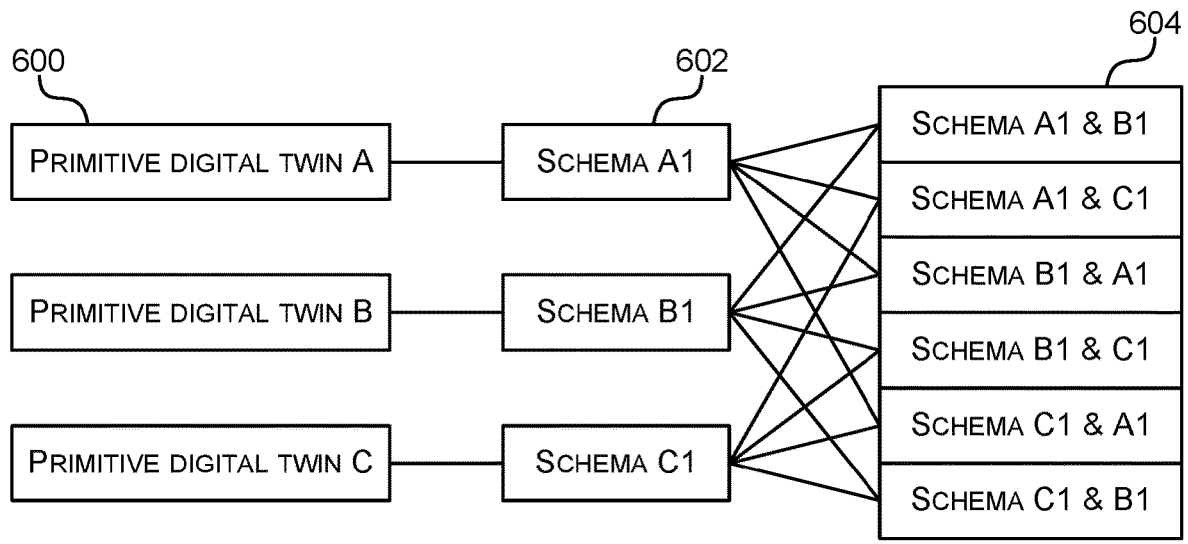
FIG. 6A is a schematic diagram of part of the method of FIG. 5 comprising gossiping between potential digital twins in the same time interval.

FIG. 6A is a schematic diagram of part of the method of FIG. 5 comprising gossiping between potential digital twins in the same time interval. FIG. 6A shows three primitive digital twins 600 (primitive digital twin A, primitive digital twin B and primitive digital twin C). Each primitive digital twin has computed a current version of its own dynamic schema using the process of FIGS. 4A and 4B. Thus primitive digital twin A has computed schema A1, primitive digital twin B has computed schema B1 and primitive digital twin C has computed schema C1. There is a gossip channel between each possible ordered pair of primitive digital twins, so between A and B, A and C, B and A, B and C, C and A, and C and B. Schemas are sent and received over the gossip channels and, for each gossip channel, comparisons are computed between the schemas sent and received on that channel. The comparisons comprise intersections computed between pairs of schemas. An intersection operation is denoted by the symbol & in FIGS. 6A to C. Thus there is an intersection computed between schemas A1 and B1, between schemas A1 and C1, between schemas B1 and A1, between schemas B1 and C1, between schemas C1 and A1 and between schemas C1 and B1.

Figure 6B:
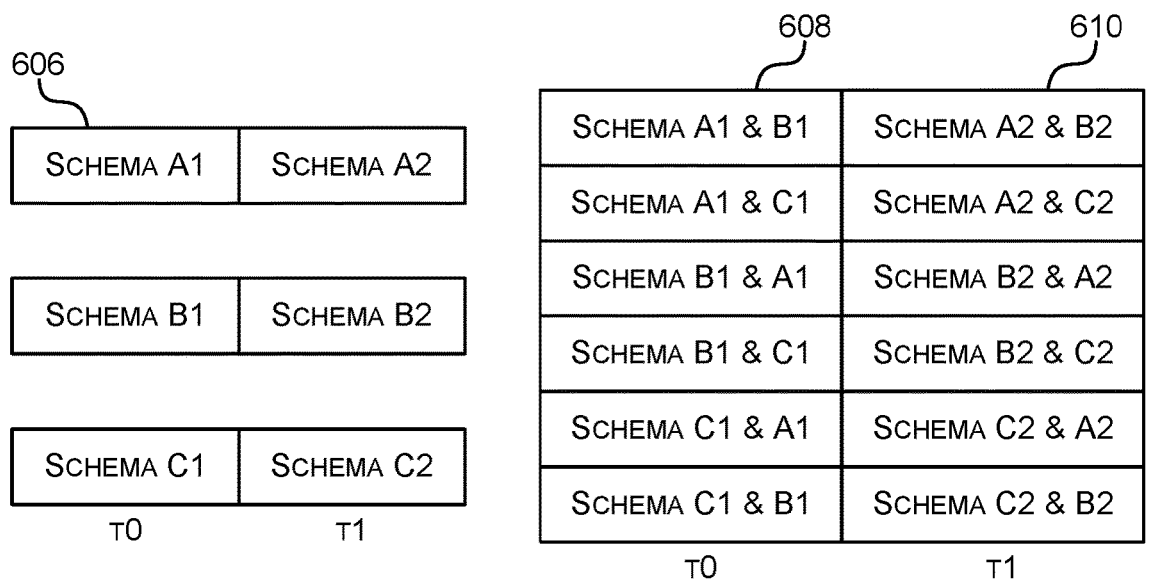
FIG. 6B is a schematic diagram of part of the method of FIG. 5 comprising gossiping between time intervals.

FIG. 6B is a schematic diagram of part of the method of FIG. 5 comprising gossiping between potential digital twins in different time intervals. Since a digital twin dynamically computes its own schema, the schema changes over time according to changes in the event data stream received by the digital twin. Digital twin A computes schema A1 at time interval t0 and schema A2 at time interval t1. Digital twin B computes schema B1 at time interval t0 and schema B2 at time interval t1. Digital twin C computes schema C1 at time interval t0 and schema C2 at time interval t1. Gossip channels exist between the digital twins in the same way as for FIG. 6A although these are not drawn in FIG. 6B to save space and make the drawing clear. Schemas are sent and received over the gossip channels and, for each gossip channel, comparisons are computed between the schemas sent and received on that channel and taking into account the different time intervals. The comparisons are intersections represented by the symbol "&" in FIG. 6B. Thus there is an intersection 608 computed between schemas A1 and B1, between schemas A1 and C1, between schemas B1 and A1, between schemas B1 and C1, between schemas C1 and A1 and between schemas C1 and B1. In addition, since the time intervals are taken into account, there are intersections 619 computed between schemas A2 and B2, A2 and C2, B2 and A2, B2 and C2, C2 and A2 and C2 and B2.

Figure 6C:
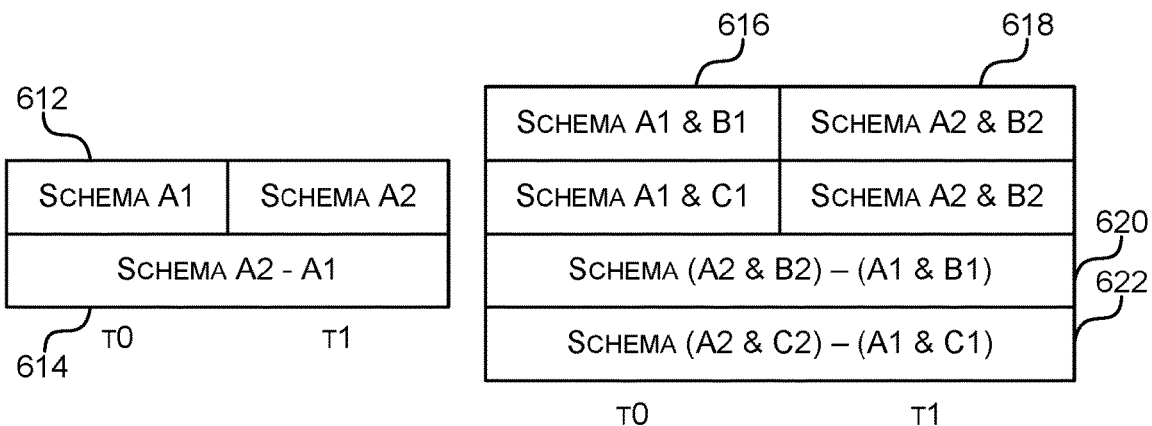
FIG. 6C is a schematic diagram of part of the method of FIG. 5 comprising gossiping between time intervals and between potential digital twins.

Hybrids of the gossiping of FIGS. 6A and 6B are used in some cases. For example, FIG. 6C shows gossiping between potential digital twins in different time intervals and also between different digital twins. Here digital twin A computes schema A1 612 at time interval t0 and computes schema A2 at time interval t1. Digital twin A also computes a difference 614 between schema A2 and schema A1. Gossip channels exist between the digital twins in the same way as for FIG. 6A although these are not drawn in FIG. 6C to save space and make the drawing clear. Schemas, and differences between schemas over time, are sent and received over the gossip channels. As in FIG. 6B differences between schemas of different digital twins are computed for different time intervals. Thus in FIG. 6B an intersection 616 is computed between schemas A1 and B1, schemas A1 and C1, schemas A2 and B2 618, and schemas A2 and B2. Also, differences are computed 620, 622 across time intervals, between schema intersections of pairs of digital twins. For example, the difference between the intersection between schema A2 and B2 and the intersection between schema A1 and B1.

Figure 6D:
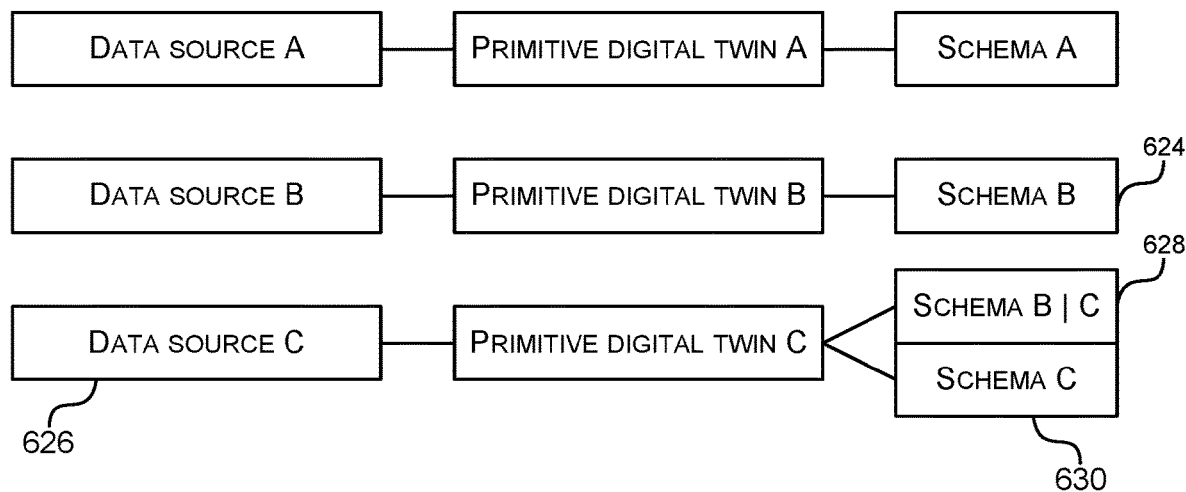
FIG. 6D is a schematic diagram of part of the method of FIG. 5 comprising changing the bandwidth on a gossip channel.

FIG. 6D shows how unions are computed rather than intersections in some examples. Data sources are input to primitive digital twins A, B, C which compute schemas. The schemas are gossiped between the primitive digital twins as for FIG. 6A although the gossip channels are not shown in FIG. 6D for clarity. Thus the primitive digital twins are able to compute unions between their own schema and one or more schemas of their neighbors which are received on the gossip channels. In the example of FIG. 6D primitive digital twin C receives schema A and schema B via gossip channels from primitive digital twin A and primitive digital twin B. It is able to compute a union between its own schema, schema C, and a schema received on a gossip channel such as schema B.

Figure 7:
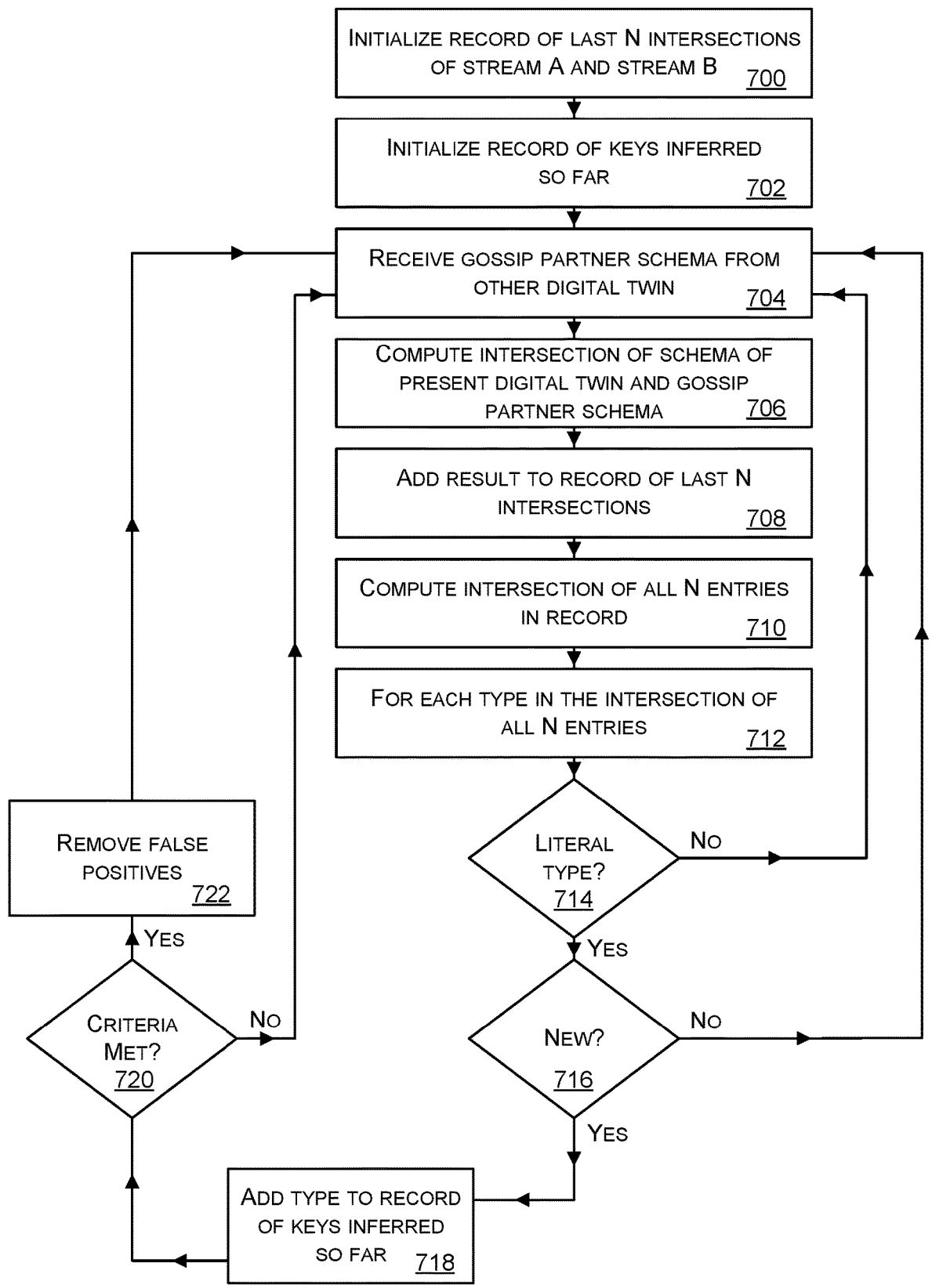
FIG. 7 is a flow diagram of part of the method of FIG. 6A in more detail.

FIG. 7 is a flow diagram of a method of key relation inference which is optionally carried out as part of the distributed inference process (112 of FIG. 1) such as at operations 508 and/or 512 of FIG. 5 in which checks are made to find correlations. A key is a structural type of a schema together with metadata about the structural type. A key relation is a correspondence between a first structural type of one event data stream and a second structural type of a second event data stream. In an example, a first structural type is string observed in an event data stream from a physical entity such as a traffic signal apparatus; and a second structural type is a string observed in an event data stream from another physical entity. Key relation inference infers that the first and second structural types have a correspondence even though the actual values of the strings are different. The correspondence indicates a semantic relationship between the structural types, such as that they both represent an identifier of a traffic signal apparatus. The relationship is inferred by the key relation inference but the semantic meaning of the relationship remains unknown unless information from an independent source is available such as data about what the physical entities are. Key relation inference is an extremely powerful way of enabling the digital twins to understand relationships between each other. Once these relationships are known the digital twins are better at describing their own behavior since their own behavior is not something that can be considered in isolation and must take into account the influences of other digital twins in the environment. The inferred key relation knowledge enables a digital twin to understand what keys it has in common with other digital twins in its environment. Thus it is possible to find what keys a group of digital twins have in common.

Key relations between streams are inferred by computing the intersection (which is an approximation of the greatest lower bound) of the inferred types of the event data streams. To reduce the probability of fluke key matches, the intersection of the stream types is sampled periodically, and stored in a finite ring buffer. The intersection of samples in the ring buffer (that is, the intersection of the previous N intersections of the inferred stream types) represent the common subtype of both streams. The literal field types of that common subtype represent the shared keys between the streams. An example method of key relation inference is now described with reference to FIG. 7 and this method is performed by a digital twin.

The digital twin initializes 700 a record of the last N intersections of stream A and stream B. The parameter N is an integer value set by an operator or configured automatically. In some cases N is a positive integer below ten. The greater the value of N the more noise is removed and the more computation is done. Therefore a value of N which is as low as possible in order to give accurate key inference is used. The value of N is adjusted automatically as the method of FIG. 7 repeats in some cases. The digital twin initializes 702 a record to store keys that have been inferred so far and initially this record is empty.

The digital twin receives 704 a gossip partner schema from another digital twin as part of the gossip process (504 of FIG. 5). The digital twin computes 706 an intersection of the schema of the present digital twin and the received gossip partner schema. The intersection is efficient to compute and is an approximation of the greatest lower bound. Even though the intersection operation is an approximation of the greatest lower bound the use of the intersection operation in the process of FIG. 7 is found to give accurate key inference results. By using the intersection operation it is possible to execute the method of FIG. 7 for large amounts of incoming gossip partner schemas even where the digital twin is an edge computing device with relatively limited processing capability as compared with cloud computing resources.

The result of the intersection computation is added 708 to the record of the last N intersections. In some cases the record of the last N intersections is a ring buffer.

The digital twin computes 710 the intersection of the entries in the record of the last N intersections. The digital twin then, for each type in the intersection of the last N entries, checkes if the type is a literal type at check 714. If it is a literal type the digital twin checks if the literal type is new at check 716 or whether the literal type is already present in the record of keys inferred so far. If the literal type is new it is added 718 to the record of keys inferred so far.

If the type is not a literal type at check 714 the process returns to operation 704 and continues from that point. If the type is not new at check 716 the process returns to operation 704 and continues from that point.

After adding a new literal type to the record of keys inferred so far at operation 718 the digital twin checks if criteria are met at check 720 in order to decide whether to carry out a false positive removal process 722. The false positive remove process is expensive in terms of computing resources and time as compared with other operations of FIG. 7. Thus by making the check at operation 720 efficiencies are gained because the false positive remove process is only carried out when needed. The criteria at check 720 enable the digital twin to check whether a threshold number of iterations of the key relation inference process have been carried out, or whether a specified time interval has elapsed since the last false positive removal process execution.

The false positive removal process 722 comprises, for each inferred key in the record of keys inferred so far, re-computing the intersection of all N entries in the record of last N intersections as at operation 610, and then checking for the structural type of the inferred key whether it is a literal type. If not the inferred key is remove from the record of keys inferred so far.

Figure 8:
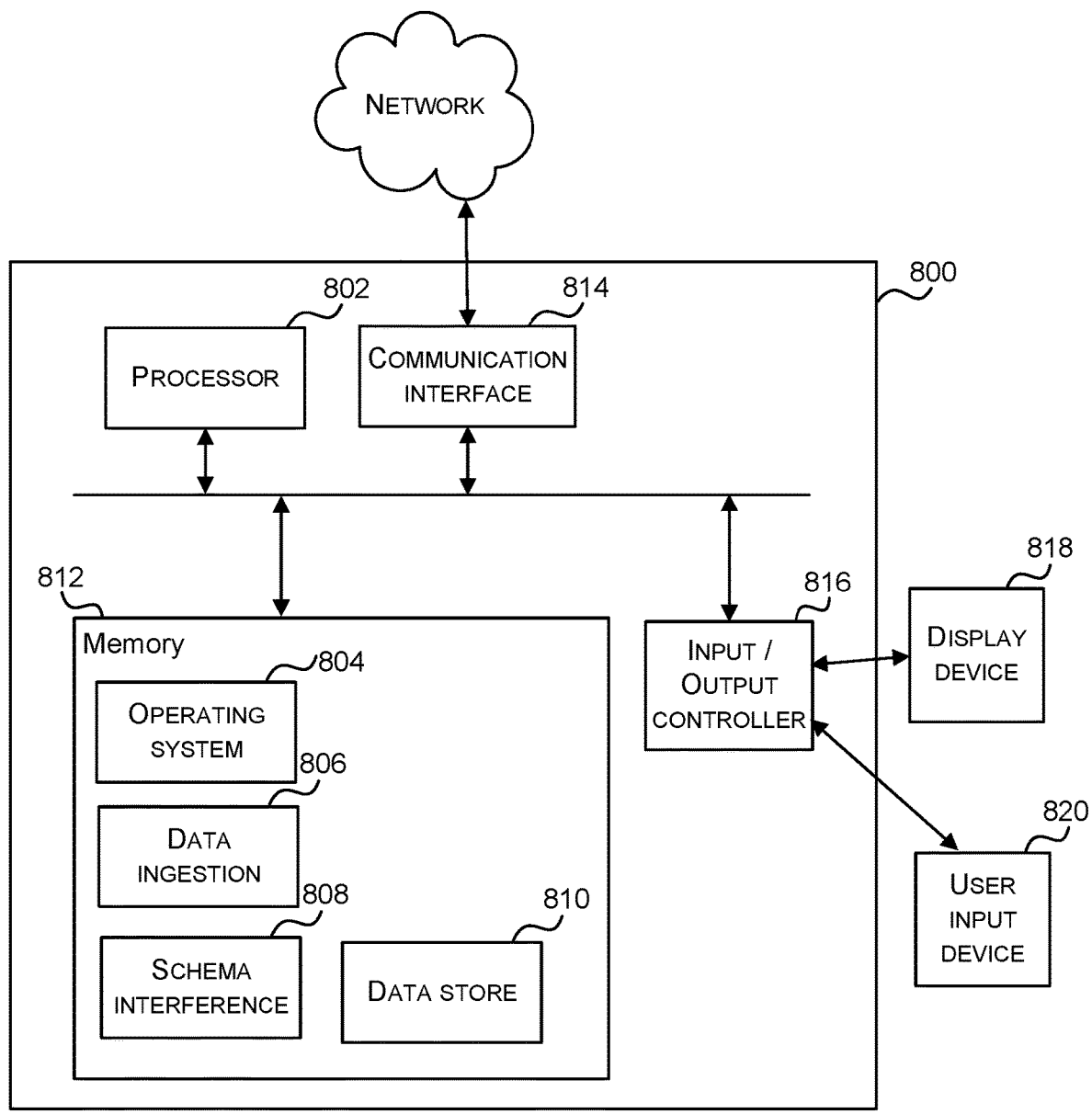
FIG. 8 illustrates an exemplary computing-based device in which embodiments of a digital twin inference apparatus is implemented.

FIG. 8 illustrates various components of an exemplary computing-based device 800 which are implemented as any form of a computing and/or electronic device, and in which embodiments of a digital twin are implemented in some examples.

Computing-based device 800 comprises one or more processors 802 which are microprocessors, controllers or any other suitable type of processors for processing computer executable instructions to control the operation of the device in order to receive and process event stream data and gossiped schemas from other digital twins, in order to infer digital twins and relationships between the digital twins. In some examples, for example where a system on a chip architecture is used, the processors 802 include one or more fixed function blocks (also referred to as accelerators) which implement a part of the method of any of FIGS. 3A, 3C, 4A, 4B, 5, 6A to 6D, and 7 in hardware (rather than software or firmware). Platform software comprising an operating system 804 or any other suitable platform software is provided at the computing-based device to enable application software to be executed on the device including a data ingestion component 806 and a schema inference component 808. Data store 810 holds parameter values, event data, inferred structural types, a structural type hierarchy, schemas, inferred key relations, peer relationships and other data.

The computer executable instructions are provided using any computer-readable media that is accessible by computing based device 800. Computer-readable media includes, for example, computer storage media such as memory 812 and communications media. Computer storage media, such as memory 812, includes volatile and non-volatile, removable and non-removable media implemented in any method or technology for storage of information such as computer readable instructions, data structures, program modules or the like. Computer storage media includes, but is not limited to, random access memory (RAM), read only memory (ROM), erasable programmable read only memory (EPROM), electronic erasable programmable read only memory (EEPROM), flash memory or other memory technology, compact disc read only memory (CD-ROM), digital versatile disks (DVD) or other optical storage, magnetic cassettes, magnetic tape, magnetic disk storage or other magnetic storage devices, or any other non-transmission medium that is used to store information for access by a computing device. In contrast, communication media embody computer readable instructions, data structures, program modules, or the like in a modulated data signal, such as a carrier wave, or other transport mechanism. As defined herein, computer storage media does not include communication media. Therefore, a computer storage medium should not be interpreted to be a propagating signal per se. Although the computer storage media (memory 812) is shown within the computing-based device 800 it will be appreciated that the storage is, in some examples, distributed or located remotely and accessed via a network or other communication link (e.g. using communication interface 814).

The computing-based device 800 optionally comprises an input/output controller 816 arranged to output display information to an optional display device 818 which may be separate from or integral to the computing-based device 800. The display information may provide a graphical user interface such as for displaying inferred types, schemas, inferred key relations, inferred digital twins and other data. The input/output controller 816 is also arranged to receive and process input from one or more devices, such as a user input device 820 (e.g. a mouse, keyboard, camera, microphone or other sensor). In some examples the user input device 820 detects voice input, user gestures or other user actions and provides a natural user interface (NUI). This user input may be used to set parameter values, view results and for other purposes. In an embodiment the display device 818 also acts as the user input device 820 if it is a touch sensitive display device.

The term 'computer' or 'computing-based device' is used herein to refer to any device with processing capability such that it executes instructions. Those skilled in the art will realize that such processing capabilities are incorporated into many different devices and therefore the terms 'computer' and 'computing-based device' each include personal computers (PCs), servers, mobile telephones (including smart phones), tablet computers, set-top boxes, media players, games consoles, personal digital assistants, wearable computers, and many other devices.

The methods described herein are performed, in some examples, by software in machine readable form on a tangible storage medium e.g. in the form of a computer program comprising computer program code means adapted to perform all the operations of one or more of the methods described herein when the program is run on a computer and where the computer program may be embodied on a computer readable medium. The software is suitable for execution on a parallel processor or a serial processor such that the method operations may be carried out in any suitable order, or simultaneously.

This acknowledges that software is a valuable, separately tradable commodity. It is intended to encompass software, which runs on or controls "dumb" or standard hardware, to carry out the desired functions. It is also intended to encompass software which "describes" or defines the configuration of hardware, such as HDL (hardware description language) software, as is used for designing silicon chips, or for configuring universal programmable chips, to carry out desired functions.

Those skilled in the art will realize that storage devices utilized to store program instructions are optionally distributed across a network. For example, a remote computer is able to store an example of the process described as software. A local or terminal computer is able to access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a digital signal processor (DSP), programmable logic array, or the like.

Any range or device value given herein may be extended or altered without losing the effect sought, as will be apparent to the skilled person.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The operations of the methods described herein may be carried out in any suitable order, or simultaneously where appropriate. Additionally, individual blocks may be deleted from any of the methods without departing from the scope of the subject matter described herein. Aspects of any of the examples described above may be combined with aspects of any of the other examples described to form further examples without losing the effect sought.

The term 'comprising' is used herein to mean including the method blocks or elements identified, but that such blocks or elements do not comprise an exclusive list and a method or apparatus may contain additional blocks or elements.

The term 'subset' is used herein to refer to a proper subset such that a subset of a set does not comprise all the elements of the set (i.e. at least one of the elements of the set is missing from the subset).

It will be understood that the above description is given by way of example only and that various modifications may be made by those skilled in the art. The above specification, examples and data provide a complete description of the structure and use of exemplary embodiments. Although various embodiments have been described above with a certain degree of particularity, or with reference to one or more individual embodiments, those skilled in the art could make numerous alterations to the disclosed embodiments without departing from the scope of this specification.

The invention claimed is:

1. A computer-implemented method performed by a digital twin configured to provide a model of behavior of a physical entity in a communications network, the method comprising:

receiving at least one stream of event data observed from an environment;

computing, by at least one processor, at least one schema from the at least one stream of event data, the schema being a compressed representation of the at least one stream of event data, wherein:

computing the schema comprises repeatedly inferring a structural type of the event data, as instances of the event data are received in the at least one stream of event data, by computing a literal type of an instance of the event data and computing a least upper bound between the literal type and a current value of the inferred structural type, and setting the inferred structural type to be a result of the least upper bound computation; and the inferred structural type of the event data is learned over time based on the at least one stream of event data observed from the environment;

participating in a distributed inference process by sending information about the schema to another digital twin in the communications network and receiving information about another schema representing at least one other stream of event data received by the other digital twin;

computing comparisons of the sent information and the received information;

based on the comparisons, determining that the schema and the other schema are correlated;

based on determining that the schema and the other schema are correlated, aggregating the digital twin and the other digital twin by redirecting the at least one other stream of event data to the digital twin instead of the other digital twin; and based on the aggregating, receiving by the digital twin the at least one stream of event data and the at least one other stream of event data via the communications network.

2. The method of claim 1 wherein the physical entity is an apparatus or a process, and wherein the method further comprises one or more of:

configuring, managing, or controlling the apparatus or process using the digital twin.

3. The method of claim 1 wherein the structural type of the event data represents information about a structure of the event data.

4. The method of claim 1 wherein the least upper bound is computed using a union operation.

5. The method of claim 1 further comprising simplifying the inferred structural type if a size of the inferred structural type exceeds a threshold, and where simplifying the inferred structural type comprises using a more general structural type from a hierarchy of structural types.

6. The method of claim 1 further comprising computing a plurality of the inferred structural types over time and computing the schema by computing unions of the plurality of inferred structural types.

7. The method of claim 1 wherein the comparisons are implemented over a plurality of different time intervals.

8. The method of claim 1 wherein the comparisons comprise computing an intersection or a delta.

9. The method of claim 1 wherein participating in the distributed inference process comprises receiving information about a plurality of potential digital twins in communication with an edge device.

10. The method of claim 9 further comprising selecting the other digital twin from the plurality of potential digital twins to gossip with over a gossip channel.

11. The method of claim 10 wherein the selection is made on the basis of physical proximity.

12. The method of claim 10 further comprising increasing a bandwidth of the gossip channel for sending the information about the schema and receiving the information about the other schema.

13. The method of claim 10 where gossiping comprises sending one or more of the following over the gossip channel: a schema, a plurality of schemas associated with different time intervals, a difference between a pair of schemas where each schema in the pair is associated with a different time interval, an intersection between a pair of schemas where each schema in the pair is associated with a different digital twin.

14. The method of claim 10 further comprising inferring one or more keys shared by the schema and the other schema by computing intersections of the schema and the other schema.

15. The method of claim 14 further comprising adding the computed intersections to a record of last N intersections and computing an intersection of entries in the record of last N intersections.

16. The method of claim 15 further comprising, for each entry in the record of last N intersections, if the entry is a literal type and if it is not yet in a record of inferred keys, adding the literal type to the record of inferred keys.

17. The method of claim 14 further comprising, when criteria are met, carrying out a process to remove false positives keys.

18. A computing device in a communications network, the computing device comprising a digital twin that provides a model of behavior of a physical entity, the digital twin configured to:

receive at least one stream of event data observed from an environment;

compute, by at least one processor, at least one schema from the at least one stream of event data, the schema being a compressed representation of the at least one stream of event data, wherein:

computing the schema comprises repeatedly inferring a structural type of the event data, as instances of the event data are received in the at least one stream of event data, by computing a literal type of an instance of the event data and computing a least upper bound between the literal type and a current value of the inferred structural type, and setting the inferred structural type to be a result of the least upper bound computation; and the inferred structural type of the event data is learned over time based on the at least one stream of event data observed from the environment;

participate in a distributed inference process by sending information about the schema to another digital twin in the communications network and receiving information about another schema representing at least one other stream of event data received by the other digital twin;

compute comparisons of the sent information and the received information;

based on the comparisons, determine that the schema and the other schema are correlated;

based on determining that the schema and the other schema are correlated, aggregate the digital twin and the other digital twin by redirecting the at least one other stream of event data to the digital twin instead of the other digital twin; and based on the aggregating, receive by the digital twin the at least one stream of event data and the at least one other stream of event data via the communications network.

19. A non-transitory computer storage media storing instructions that, when executed by at least one processor, cause a digital twin that provides a model of behavior of a physical entity to:

receive at least one stream of event data observed from an environment;

compute at least one schema from the at least one stream of event data, the schema being a compressed representation of the at least one stream of event data, wherein:

computing the schema comprises repeatedly inferring a structural type of the event data, as instances of the event data are received in the at least one stream of event data, by computing a literal type of an instance of the event data and computing a least upper bound between the literal type and a current value of the inferred structural type, and setting the inferred structural type to be a result of the least upper bound computation; and the inferred structural type of the event data is learned over time based on the at least one stream of event data observed from the environment;

participate in a distributed inference process by sending information about the schema to another digital twin in the communications network and receiving information about another schema representing at least one other stream of event data received by the other digital twin;

compute comparisons of the sent information and the received information;

based on the comparisons, determine that the schema and the other schema are correlated;

based on determining that the schema and the other schema are correlated, aggregate the digital twin and the other digital twin by redirecting the at least one other stream of event data to the digital twin instead of the other digital twin; and based on the aggregating, receive by the digital twin the at least one stream of event data and the at least one other stream of event data via the communications network.

* * * * *